Aug. 27, 1957     F. E. SINGELMAN     2,804,572
METHOD AND APPARATUS FOR TESTING TELEVISION RECEIVER COMPONENTS
Filed July 1, 1955
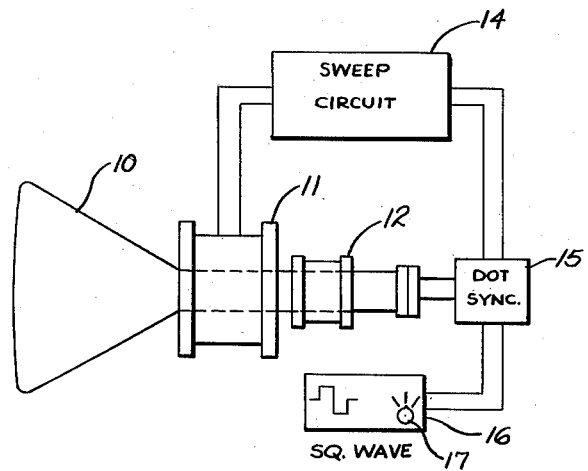
INVENTOR.
FRED E. SINGELMAN
BY
J. D. Douglas
HIS ATTORNEY

United States Patent Office 2,804,572
Patented Aug. 27, 1957

2,804,572

METHOD AND APPARATUS FOR TESTING TELEVISION RECEIVER COMPONENTS

Fred E. Singelman, Palatine, Ill., assignor to Admiral Corporation, Chicago, Ill., a corporation of Delaware Application July 1, 1955, Serial No. 519,461

5 Claims. (Cl. 315—27)

This invention relates to a method and apparatus for testing television receiver components and more particularly to an apparatus for testing a yoke for a color television receiver.

As is well known to those versed in the art, one type of color television picture tube has three electron guns each of which emits beams of electrons which beams are projected through apertures in a so-called "shadow mask" after which the discrete beams fall on discrete phosphor dots which are disposed in triads on the face of the tube. Since the three guns are controlled by separate color signals as well as a signal defining brilliancy and they are equally spaced about the axis of the tube neck, means must be provided to cause proper convergence of the electron beams so that each will fall upon and activate the proper phosphor dots.

Effecting of convergence and a proper scanning of the face of the tube by the electron beam is effected by the coordination of a number of different components. One of these components is a yoke which is energized to set up a magnetic field to cause this convergence as well as the proper sweeping of the beams across the face of the tube. Inasmuch as there are numerous adjustments to be made to effect the convergence it is highly desirable to eliminate from the coordinating components as many adjustable variables as is possible. Therefore, wherever possible it is desirable to provide means for testing these components prior to installation to make sure that they will not add a variable which causes the adjustment to be difficult due to the fact that it is not always possible to quickly locate which variable is causing the difficulty.

It is possible by my present invention to test the yoke prior to its installation and to determine the operating characteristic of the yoke in such a manner and to such a degree of accuracy that normally after installation the yoke can be ignored as a factor which might be causing improper operation. By this testing operation yokes that do not come within the allowable tolerances of operation are discarded and only those which come up to proper standards are used.

The figure of the drawing is a diagrammatic illustration of an apparatus suitable for carrying out the invention.

Briefly the invention contemplates using the yoke to deflect the electron beam in a single gun tube while using another means to cause periodic deflection of the beam which simulates the effect of the off center guns in the color tube and, at the same time, applying a series of recurring signals to modulate the beam which provides a predetermined pattern upon the screen from which pattern the operational characteristics of the yoke may be determined.

More particularly a picture tube 10 of the single gun type is provided, and the yoke 11, which may be a yoke for use in a color television receiver is placed on the neck of the tube adjacent the outwardly flared portion. The yoke 11 is energized from the sweep signal generator 14 which provides the normal sweep signals to the yoke to perform the usual horizontal and vertical deflection of the electron beam to provide a normal raster upon the screen.

The sweep generator is energized and the yoke is synchronized with a dot generator 15. The dot generator provides dot signals to the tube which provides a series of dots on the face of the tube equally spaced vertically and horizontally from each other across the tube.

Although its is expedient to provide a dot pattern it wil be appreciated that bar patterns could also be used if desired.

Having established a dot (or bar) pattern on the screen it remains to synthesize the effect of the offset guns. This is done by providing an auxiliary yoke 12 having the usual deflection coils therein and which yoke is connected to a generator which generates a periodically recurring square wave signal.

Preferably this signal is what is known as a 50 percent square wave signal having alternate positive and negative half cycles of equal amplitude and duration, the amplitude of which may be varied between certain limits by means of a gain control 17. It is desirable that the signals be at a frequency which is harmonic or sub-harmonic of the sweep frequency. The generator 16 may be tied to the dot generator 15 to assure a proper synchronized relationship.

If an auxiliary yoke frequency of 30 cycles is used it will be apparent that the beam will be deflected in a manner, prior to passing through the yoke under test, which can simulate the effect realized when the guns are off center. Since it is the purpose of the test to bring the beam back into position, it is possible to observe the dot pattern and determine if the yoke is functioning properly or within the limits previously determined.

The strength of the field generated in the auxiliary yoke is determined by the amplitude of the square wave signal and should be sufficient to shift the dots from a first position to a second position such that when a dot moves from a first position to a second position it takes the place of the dot that had previously been in that position and is now moved to another postion. Since the dots (or bars) are regularly and equally spaced and are shifted rapidly back and forth, if the yoke is properly functioning, there will be no apparent change in the dot pattern. If, however, the yoke is not functioning properly the dot which moves into the position of the dot that it just replaced will not appear in exactly the same position but due to the persistence of the image there will be apparently two dots where there was previously one, which dots are offset relative to each other an amount determined by the inability of the yoke under test to bring the beam back into proper position.

It can then be determined just how far a yoke departs from the standard by increasing or decreasing the amplitude of the square wave signal. For instance, if it is found that the dots can be aligned by a relatively minor adjustment of the square wave signal amplitude it can be stated that the yoke under test comes within the allowable tolerances, it having previously been determined what these tolerances are. If, however, it is found that it requires a greater than normal change in the square wave signal amplitude to cause alignment of the dots then the yoke under test may be discarded.

The gain control on the square wave generator may be calibrated in terms of "good" or "bad," or it may be calibrated in percentage of change necessary to obtain alignment of the dots.

Once the apparatus has been calibrated it merely becomes a question of inspecting the dot formation and if the gain control on the square wave generator is within the limits set, the yoke is acceptable and if beyond the limits the yoke is discarded. It will be apparent that with this method of testing the yokes may be tested quickly and efficiently by personnel of limited experience. Yokes so tested may be normally installed in a receiver with reasonable assurance that they have the proper qualifications for the purpose intended.

Having eliminated the yoke as a variable, the final alignment and convergence of the receiver is expedited with a savings of time, labor, and an increase in production.

Having thus described my invention I am aware that numerous and extensive departures may be made therefrom without departing from the spirit of the invention as defined by the scope of the appended claims.

I claim:

1. The method of testing a deflection yoke for a multiple offset gun color television system which comprises placing the yoke on the neck of a single gun tube and supplying sweep signals thereto to generate a raster, placing a second yoke on said tube and applying a signal thereto which may be varied in amplitude to deflect the beam prior to passage through the yoke under test, applying a modulated signal to the control element of the tube to provide a dot pattern in the tube, and adjusting the amplitude of the signal applied to said second yoke to provide a predetermined dot pattern in the tube.

2. A color television yoke testing apparatus comprising a single gun tube for receiving the yoke under test, means to apply a sweep signal to the yoke under test, a second yoke on said tube for deflecting the beam prior to its passage through the yoke under test, means for applying a square wave voltage to said second yoke for deflecting the beam prior to passage through the yoke under test, and a signal generator connected to a control element of said tube to provide a periodically recurring pattern.

3. A device as described in claim 2 where the square wave voltage is synchronized with the signal generator to a harmonic thereof.

4. A device as described in claim 2 where the square wave signal is a square wave having alternate positive and negative half cycles of equal amplitude and duration, the amplitude of which may be varied between predetermined limits.

5. The method of testing a deflection yoke for a multiple offset gun color television system which comprises placing the yoke on the neck of a single gun tube and supplying sweep signals thereto to generate a raster, placing a second yoke on said tube and applying a signal thereto which may be varied in amplitude to deflect the beam prior to passage through the yoke under test, applying a modulated signal to the control element of the tube to provide a periodically recurring pattern in the tube, and adjusting the amplitude of the signal applied to said second yoke to provide a predetermined periodically recurring pateren in the tube.

References Cited in the file of this patent

UNITED STATES PATENTS

| | | |
|---|---|---|
| 2,168,760 | Calbick | Aug. 8, 1939 |
| 2,578,343 | Ekvall | Dec. 11, 1951 |
| 2,619,612 | Lawrence | Nov. 25, 1952 |
| 2,679,614 | Friend | May 25, 1954 |